United States Patent
Buchert et al.

(10) Patent No.: US 7,177,319 B2
(45) Date of Patent: Feb. 13, 2007

(54) INSERTION SORTER

(75) Inventors: Ryan Samuel Buchert, Breinigsville, PA (US); Chayil Timmerman, Harleysville, PA (US); Younglok Kim, Fort Lee, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 908 days.

(21) Appl. No.: 10/034,824

(22) Filed: Dec. 27, 2001

(65) Prior Publication Data

US 2003/0123418 A1 Jul. 3, 2003

(51) Int. Cl.
*H04J 3/16* (2006.01)
(52) U.S. Cl. ........................................ 370/437
(58) Field of Classification Search ............. 370/277, 370/310, 328, 345, 349, 431, 432, 437, 442, 370/458, 459, 464, 474, 537–541; 455/59–63, 455/296
See application file for complete search history.

(56) References Cited

U.S. PATENT DOCUMENTS

| | | | | |
|---|---|---|---|---|
| 4,030,077 A | * | 6/1977 | Florence et al. | 712/300 |
| 4,031,520 A | * | 6/1977 | Rohner | 712/300 |
| 4,991,134 A | * | 2/1991 | Ivsin | 712/300 |
| 5,068,822 A | * | 11/1991 | Lawrence | 712/300 |
| 5,079,736 A | * | 1/1992 | Kitsuregawa et al. | 707/7 |
| 5,168,567 A | * | 12/1992 | Everson et al. | 712/300 |
| 5,274,835 A | * | 12/1993 | Wakatani | 712/300 |
| 5,283,815 A | | 2/1994 | Chennakeshu et al. | |
| 5,410,689 A | * | 4/1995 | Togo et al. | 707/7 |
| 5,504,919 A | * | 4/1996 | Lee et al. | 707/7 |
| 6,137,824 A | | 10/2000 | Liu | |
| 6,456,649 B1 | | 9/2002 | Isaksson et al. | |
| 6,862,326 B1 | * | 3/2005 | Eran et al. | 375/343 |

* cited by examiner

*Primary Examiner*—Dmitry Levitan
(74) *Attorney, Agent, or Firm*—Volpe and Koenig, P.C.

(57) ABSTRACT

An insertion sorter circuit and method are provided which are particularly useful for sorting channel response values of a communication signal. The sorter circuit includes a series of sorter elements which each have a register. The circuit is configured to cascade values downwardly when one register receives a greater value than it has stored, which value is not greater than the value stored in any upstream register. At the end of processing the values, the most significant values are stored in the registers, the sum of which are the channel power estimate. The channel noise variance is obtainable by applying a system dependent scaling factor to the sum of the least significant values processed.

8 Claims, 5 Drawing Sheets

SIGNAL  N = 3 TAPS
NOISE   M = L_m - N = 54 TAPS

| TIME | P1 | P2 | P3 | NOISE |
|---|---|---|---|---|
| 0 | 0 | 0 | 0 | 0 |
| 1 | 10 | 0 | 0 | 0 |
| 2 | 10 | 3 | 0 | 0 |
| 3 | 10 | 9 | 3 | 0 |
| 4 | 10 | 9 | 3 | 2 |
| 5 | 12 | 10 | 9 | 5 |
| 6 | 12 | 10 | 9 | 12 |
| 7 | 12 | 10 | 9 | 18 |
| ⋮ | ⋮ | ⋮ | ⋮ | ⋮ |
| 57 | $P1_{MAX}$ | $P2_{MAX}$ | $P3_{MAX}$ | $NOISE_{TOT}$ |

$P1_{MAX} \geq P2_{MAX} \geq P3_{MAX}$

INSERTION SORTER

BACKGROUND

The invention generally relates to wireless communication systems. In particular, the invention relates to an insertion sorter used in conjunction with estimation of noise variance within a time division multiple access (TDMA), or time division-code division multiple access (TD-CDMA) receiver.

Communication systems using TDMA and TD-CDMA signals are well known in the art. For simplicity, both types of signals are referred to as TDMA hereinafter. In communications between a user equipment (UE) and a base station, the TDMA signal has a frame structure with a plurality of time slots. For certain types of signals, each of the time slots includes two data bursts that are separated by a user specific midamble. The data bursts transmit the desired data and, the user specific midamble is used to perform channel estimation. The midamble contains a series of chips, which in turn are processed through a filter to produce a series of channel response taps.

Among the series of channel response taps are signal taps, which represent the communication signal, with the remaining taps representing noise. Depending on the specific type of TDMA system architecture, the number of signal taps is designated by a fixed predetermined value.

A TDMA receiver must screen the channel response taps to determine which taps are the signal taps. The signal taps are those taps having the greatest value. A sorter is conventionally used to identify the most significant taps as the signal taps. Several iterations of the sorter are typical of a system using conventional bubble sort methods. It is desirable to provide a sorter with a minimal number of hardware components and arranged to provide a high degree of sorting efficiency.

SUMMARY

The present invention provides a system having a sorter circuit which determines a selected number of greatest values from a set of values. The system is used for a TDMA receiver as an insertion sorter for identifying peak values of a communication channel response and determining the sum of the non-peak values. The resultant values are then used in a conventional manner to process received communication data.

For a sort depth N, the sorter circuit is configured to store N peak channel response values sorted in descending order from a set of L values. The remaining L-N channel response values are considered to be noise and are summed using a single adder, and stored in a single register as an overall noise value. The sorter circuit comprises N series-connected sorter elements. Each sorter element has a comparator and a register. A set of channel response values is sequentially processed by inputting each value simultaneously to all the sorter elements in parallel. Processing the set of channel responses with parallel inputs to each sorter element minimizes the operating time of the system such that the number of clock cycles is equal to the number of channel response values processed.

Noise variance of the communication signal can be calculated by applying to the sum of the non-peak values a predetermined scaling factor appropriate for the specific type of communication system.

Other objects and advantages of the invention will be apparent to those skilled in the art from the following description.

DETAILED DESCRIPTION OF THE PREFERRED EMBODIMENTS

Figure 1:
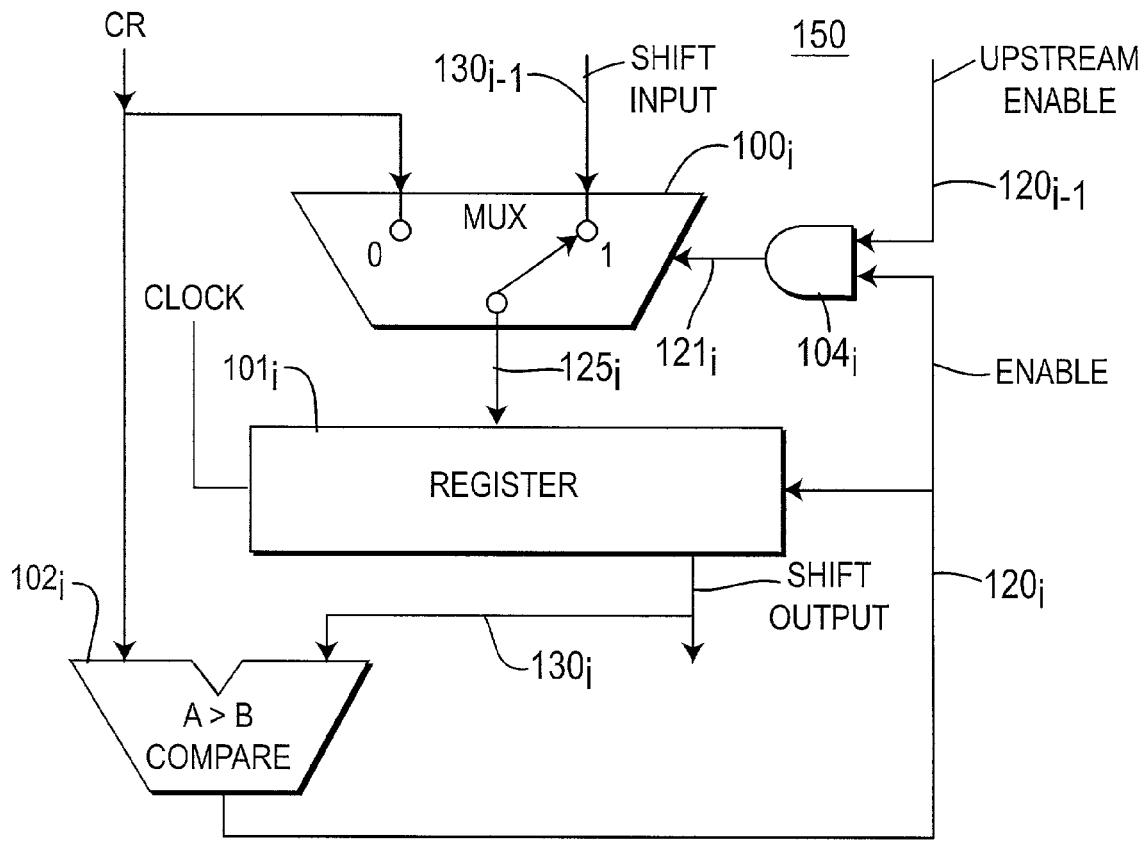
FIG. 1 shows a block diagram for a single sorter element of an insertion sorter circuit.

The present invention is described with reference to the drawing figures where like numerals represent like elements throughout. Referring to FIG. 1, there is shown a sort element 150, which comprises the basic building block of a sorter circuit 200 shown in FIG. 2. Preferably, the sorter circuit 200 is used to sort sets of communication signal channel response power values (CR values), but can be utilized to sort any set of random values.

FIG. 1 illustrates the configuration of a sorter element 150, which is adapted for downstream connection to a like sorter element. The sorter element 150 comprises a multiplexer (MUX) switch $100_i$, a register $101_i$, a comparator $102_i$ and an AND gate $104_i$.

Figure 2:
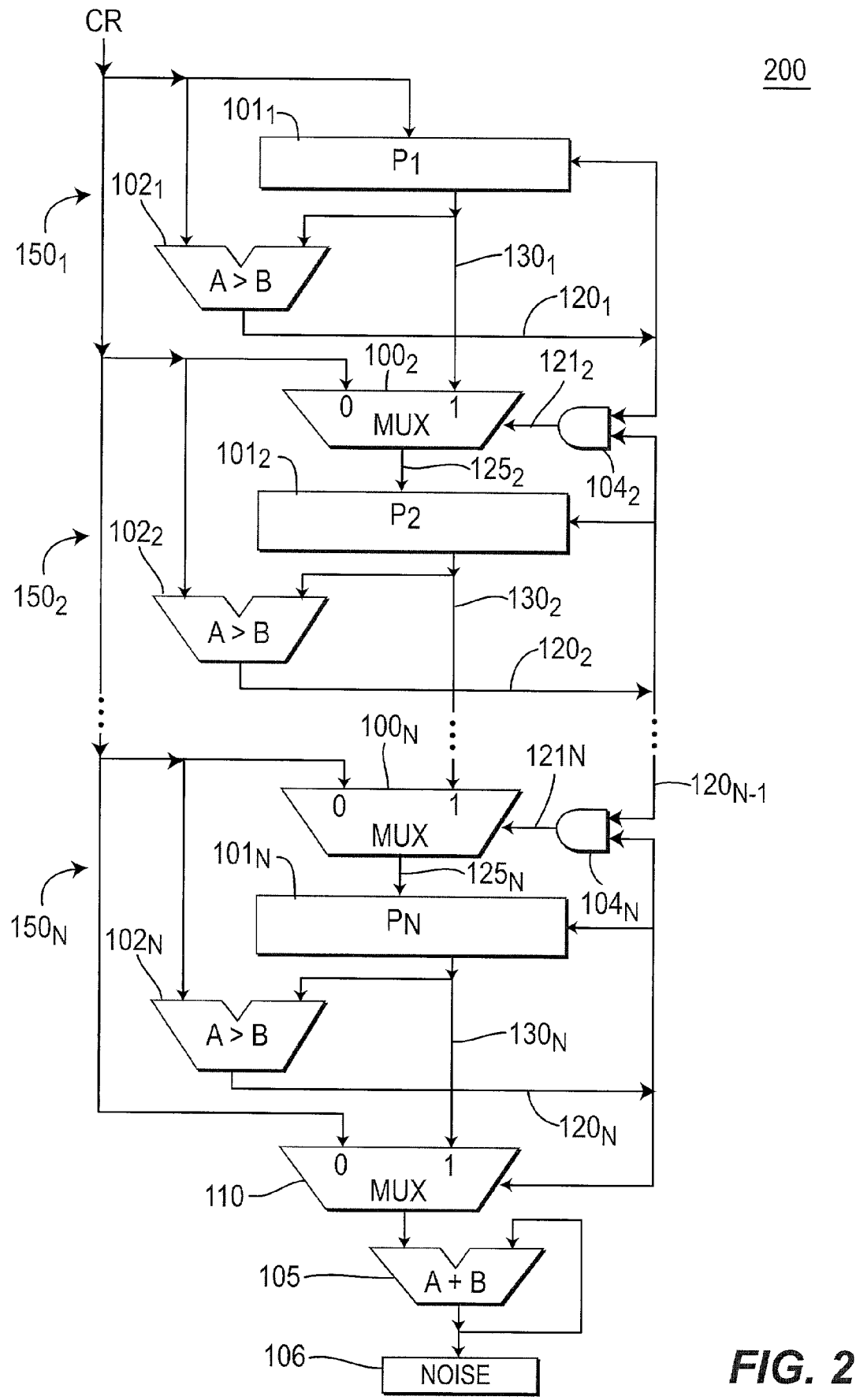
FIG. 2 shows a block diagram for an insertion sorter circuit with series-connected multiple sorter elements.

The sorter element 150 has two outputs, namely an enable output $120_i$ from the comparator $102_i$ and a shift output $130_i$ from the register $101_i$. The sorter element 150 has two inputs, namely an enable input $120_{i-1}$ for the AND gate $104_i$ and a shift input value $130_{i-1}$ for the MUX $100_i$. As shown in FIG. 2, the sorter element 150 is connected downstream of a like circuit by coupling the downstream shift input to the upstream shift output, such that both are represented by $130_i$.

The sorter element 150 also has a value input CR associated as input to both the MUX $100_i$ and the comparator $102_i$. When multiple sorter elements 150 are serially connected in a cascade for processing a set of CR values, individual CR values are input in parallel to all of the sorter elements for processing. The parallel input of the CR values for processing results in a processing cycle time for each CR value to be equal to the processing cycle time for one sorter element, since the same CR value is processed by each of the sorter elements during the same cycle.

The CR value input is an "A" input to the comparator $102_i$. The comparator also has a "B" input $130_i$ that receives the current value of register $101_i$. If the CR value is greater than the current register value, i.e. the "A" input is greater than the "B" input, the enable output $120_i$ of comparator $102_i$ is a "high" value, otherwise it is a "low" value.

The MUX $100_i$ is coupled to the register $101_i$ by a MUX output $125_i$ to output either the CR value from the CR input or the upstream register's value via the shift input $130_{i-1}$. The AND gate $104_i$ is coupled to the MUX $100_i$ via an AND gate output $121_i$. Output $121_i$ of AND gate $104_i$ is high when both enable inputs $120_i$ and $120_{i-1}$ are high, otherwise the output $121_i$ is low. When output $121_i$ is high, the MUX $100_i$ directs the value input $130_{i-1}$ to register $101_i$; when output $121_i$ is low, the MUX $100_i$ directs the CR input to register $100_i$ via MUX output $125_i$.

Register $101_i$ receives a clock pulse during each cycle, which triggers the register to change its value by loading the output $125_i$ of the MUX $100$ if the comparator output $120_i$ is high. Otherwise the register value remains unchanged.

Where sorter element 150 is connected in a series of like elements, when comparator output $120_i$ is high, the output of all downstream comparators are also high. This results in both inputs of each AND gate $104_i$ of all downstream sorter elements to also be high, so that the value of register $100_i$ is passed to the register of the next downstream element in each case. Thus, starting with the first register that has a value lower than the CR value being processed, the register values shift downwardly while maintaining an automatic sort of the processed values.

As shown in FIG. 2, any desired number N of sorter elements $150_1 \ldots 150_N$ may be serially connected to configure a sorter circuit 200. The first sorter element $150_1$ is modified slightly to eliminate the MUX and the AND gate since the only input to the first sorter circuit $150_1$ is the CR value input.

The last sorter element $150_N$ in sorter circuit 200 has its comparator's enable output $120_N$ and register's value output $130_N$ coupled to a MUX 110. MUX 110 has a CR value input and outputs the CR value to a summer/accumulator 105 during each cycle unless the comparator enable output $120_N$ is high. For a high enable output $120_N$, output $130_N$ from register $101_N$ is passed through MUX 110 to summer/accumulator 105. Summer/accumulator 105 adds the value input from MUX 110 to a stored value. That sum is output to a register 106 as a noise value and is also returned to the summer as its stored value for the next cycle.

In operation, sorter circuit 200 receives a new CR value for each cycle. Upon the clock pulse being sent to all the registers in the sorter elements $150_1$–$150_N$, that CR value will either be stored in one of the registers or passed through MUX 110 to summer 105. Where the CR value is stored in one of the registers $150_1$–$150_N$, all downstream comparator outputs will be high so that the value of the register in sorter element $150_N$ will pass through MUX 110 to be summed by the summer/accumulator 105. Accordingly, at the completion of processing of an arbitrary number L of random values, the N highest values will be stored in registers $101_1$–$101_N$ in descending order and all values not so stored will have been summed by summer/accumulator 105. Where the set of random values are CR values which include N signal values, the N signal values will be contained in registers $150_1$–$150_N$ and the remaining values will have been summed to represent a noise value in register 106.

Although the sorter circuit 200 is particularly useful in sorting CR values, it can be employed to sort any set of values. If the set has L values and L<N, all L values will reside in the registers $150_1$–$150_N$ and the summer/accumulator 105 output will be 0.

FIG. 2 shows insertion sorting circuit 200, which has a desired number N sort elements $150 \ldots 150_N$ cascaded to produce a sort depth N. Although the limit to the number of N sort elements is a factor of desired circuit size and power consumption considerations, time limits are not constraining because of the parallel input characteristics of the series of N sorter elements. During each process cycle, register $101_i$ of each sorter element 150 in sorting circuit 200 keeps its currently stored value, or updates its value with the current channel response CR value, or updates its value with the stored channel response CR value of the register $101_{i-1}$ directly upstream.

Figures 3A, 3B:
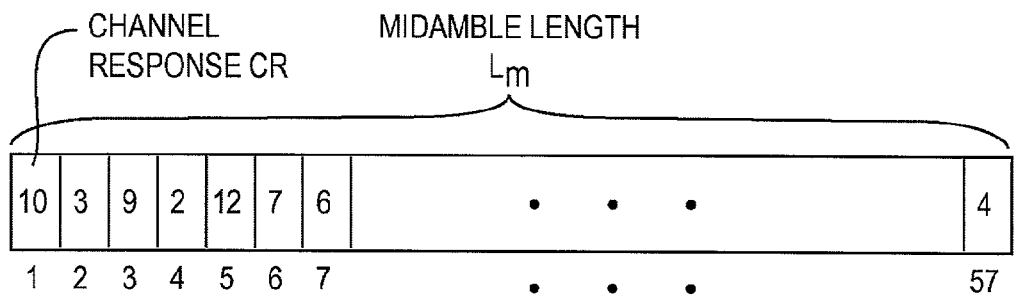
FIG. 3A shows a typical TDMA midamble with 57 channel response taps.
FIG. 3B shows a table of insertion sorter register contents for several clock pulses.
Figure 6:
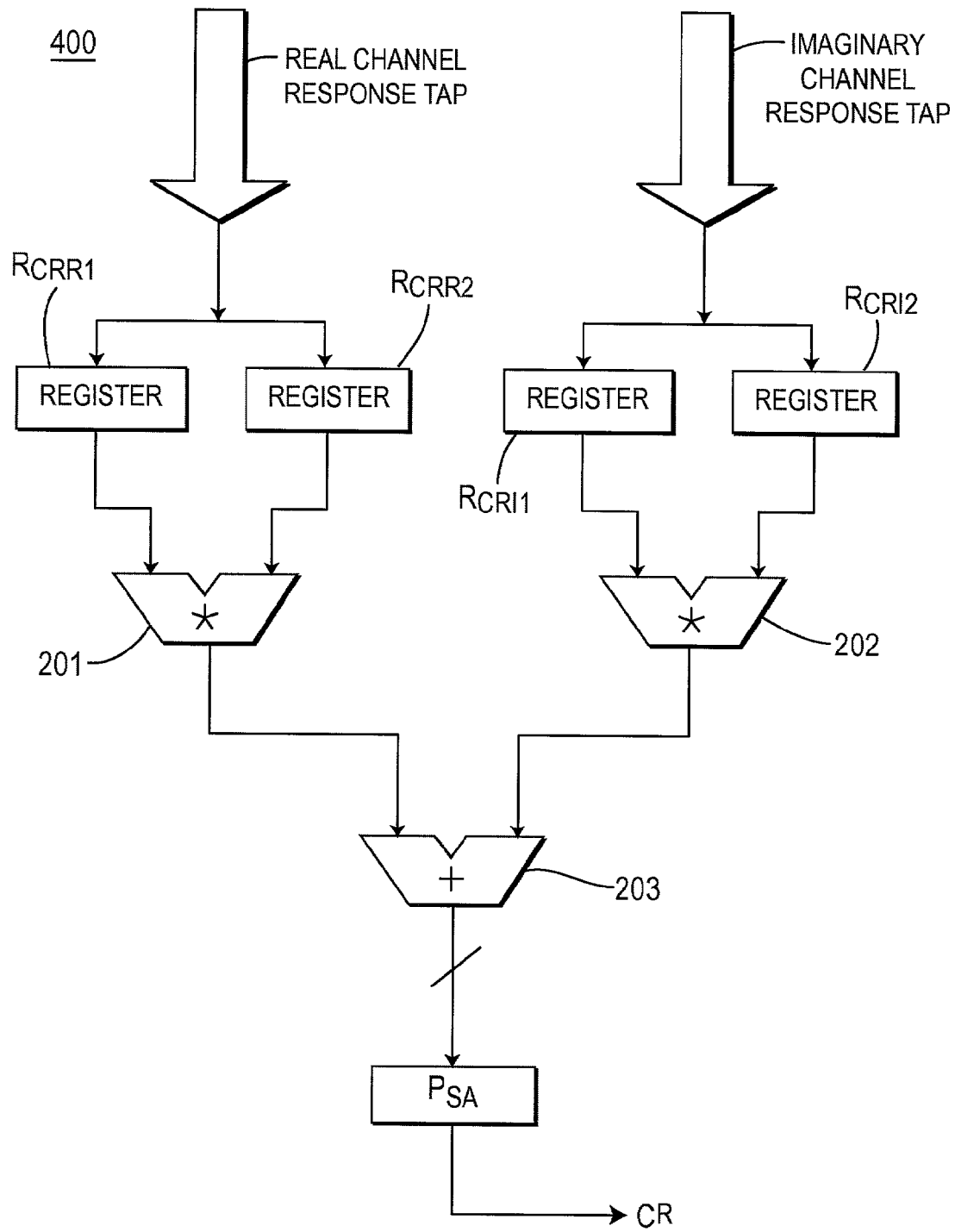
FIG. 6 shows a block diagram of the channel response square accumulator that derives the input for the insertion sorter circuit of FIGS. 2 and 4.

Turning to FIG. 3A, a data stream representative of a TDMA midamble of length $L_m$=57 chips is shown. These are processed to provide a set of 57 channel response taps from which the CR values are derived for processing in accordance with the sorter circuit of the present invention. FIG. 6 shows a block diagram of a circuit for producing CR values. Channel response taps are comprised of real and imaginary components. The real channel response taps are stored by registers $R_{CRR1}$ and $R_{CRR2}$ as duplicate values, and then squared by a multiplier 201. Similarly, the imaginary channel response taps are stored in duplicate in registers $R_{CRI1}$ and $R_{CRI2}$ and squared by a multiplier 202. An adder 203 receives the squared real and imaginary values and sends the sum to a register PSA. Register PSA accordingly stores real values since the square of the imaginary components results in a real number. These values are the preferred CR values that are sorted by the insertion sorter circuit 200.

A predetermined number N of CR values are intended to represent an estimate of channel responses that contain the actual communication signal, while the remaining number M of channel responses have values that are less than each of the N peak values, and thus are presumed to be noise on the channel. Accordingly, for the example shown in FIG. 3A, the number M of channel responses that represent noise are: $M=L_m-N=57-3=54$.

Figure 4:
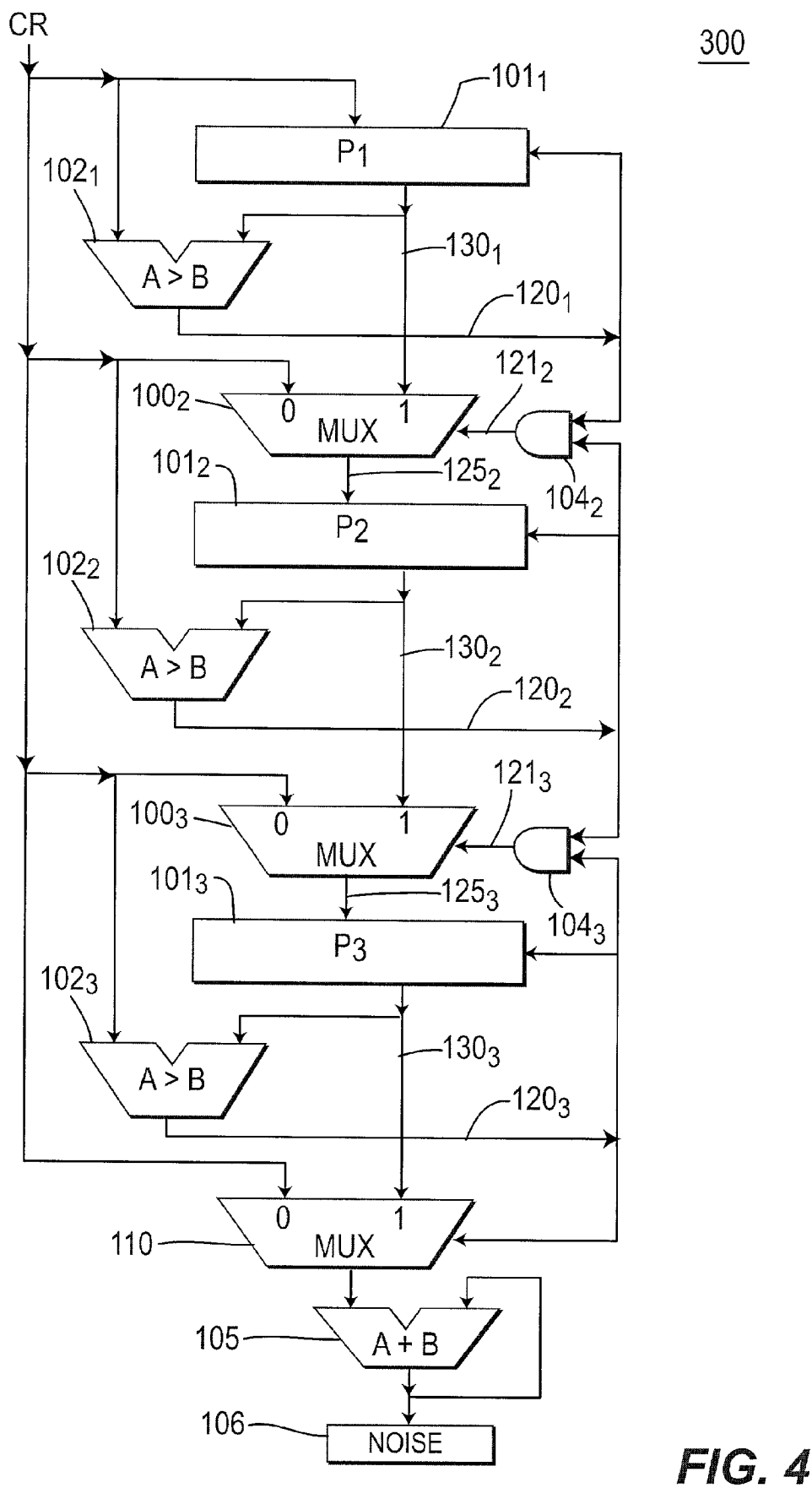
FIG. 4 shows a block diagram of an insertion sorter circuit with three sorter elements.

It should be recognized that the number $L_m$ of channel responses may be a number other than 57, and that the number N of signal elements can also vary. Some values typical in TDMA systems are $L_m$=28, 32, 64, 57 and 114, while signal element values are typically N=6 or N=10. In the following example, an arrangement of sorter elements where N=3 will be described for simplicity. FIG. 4 shows an insertion sorter circuit 300 with three registers $100_1$, $100_2$, $100_3$ that contain sorter element values P1, P2, and P3, respectively. At time t=0, each sorter element is initialized so that registers $101_1$, $101_2$, and $101_3$ contain the value 0. This is reflected in the register table shown in FIG. 3B at time t=0. As shown in FIG. 3A, it is assumed that a sequence of 57 channel responses will be loaded into the insertion sorter circuit 300, one value at a time, with each clock pulse.

At time t=1, the first channel response value CR=10 is present at the A-side of comparators $102_1$, $102_2$ and $102_3$, the input of register $101_1$, and the low (0) input of multiplexers $100_2$ and $100_3$. Simultaneously, each comparator $102_1$, $102_2$, $102_3$ evaluates the expression 10>0 and produces a high output to the enable signals $120_1$, $120_2$ and $120_3$. Register $101_1$ receives the high enable signal $120_1$ and accordingly loads the value "10" from its input. MUX $100_2$ receives a high enable input $121_2$ from AND gate $104_2$, while register $101_2$, with its high enable input $120_2$, loads the value "0" from register $101_1$.

Similarly, the value "0" from register $101_2$ is transferred through MUX $100_3$ and subsequently loads into register $101_3$, since MUX $100_3$ and register $101_3$ have a high enable signal $121_3$. The initial content value P3=0 for register $101_3$ is passed through MUX 110 to the input of adder 105 and on to register 106 as the first stored NOISE value. Accordingly, as shown in FIG. 3B at time t=1, the first clock pulse produces register values of P1=10, P2=0, P3=0 and NOISE=0.

In the next clock pulse at t=2, the channel response value CR=3 is loaded into each sort element of sorter circuit 300 at the low (0) input of multiplexers $100_2$, $100_3$, and 110, and the "A" inputs of comparators $102_1$, $102_2$ and $102_3$. The channel response value CR=3 is present at register $101_1$, but register $101_1$ does not load this value since condition (A<B) is present at comparator $102_1$ and the enable signal $120_1$ is low as a result. Register $101_2$ loads the value "3" from the low side of MUX $100_2$, as enable signal $121_2$ is low at MUX $100_2$ and enable signal $120_2$ is high at register $101_2$. The previously stored value P2=0 from register $101_2$ is passed through MUX $100_3$ and loaded into register $101_3$, since enable signals $120_3$ and $121_3$ are high. MUX 110 receives the value "0" from register $101_3$, which in turn is loaded into input "A" of adder 105, and is summed with the sum NOISE=0 stored from the prior clock pulse t=0. The new total value NOISE at register 106 becomes: NOISE=A+B=0+0=0. Consequently, the sort element values after the second clock pulse are P1=10, P2=3, P3=0, and NOISE=0, as shown in FIG. 3B at t=2.

The foregoing process is repeated at each successive clock pulse. After the occurrence of the third clock pulse (t=3), the third channel response CR=9 is retained by the second register $101_2$ and the second channel response value CR=3 is shifted to the third register $101_3$. Not until the channel response CR=N+1, does the insertion sorter circuit 300 produce a noise value, since there are N registers representative of the channel signal. Accordingly, after the fourth clock pulse (t=4), the insertion sorter circuit 300 recognizes the lowest of the first four channel response CR values as NOISE, which in this example is the fourth channel response CR=2. At the fifth clock pulse (t=5), the channel response value CR=12 is loaded into the first register $101_1$, replacing the prior peak value $P_1$ from the fourth clock pulse, $P_1$=10. Register $101_2$ receives the value "10" from MUX $100_2$, and the former content of register $101_2$ is stored into register $101_3$ via MUX $100_3$. The value "3" from register $101_3$ is passed through MUX 110, sent to adder 105 port "A", and is added to the value NOISE=2 for a total noise value NOISE=5 at register 106.

This process is repeated until all 57 CR values are sorted by sorter insertion circuit 300. In the end, register $101_1$ will contain the peak channel response value, $P1_{MAX}$, register $101_2$ will contain $P2_{MAX}$ and register $101_3$ will contain $P3_{MAX}$ where $P1_{MAX} \geq P2_{MAX} \geq P3_{MAX}$. After 57 clock pulses, register 106 will contain the total noise value NOISE, which is the sum of M=54 noise values.

Figure 5:
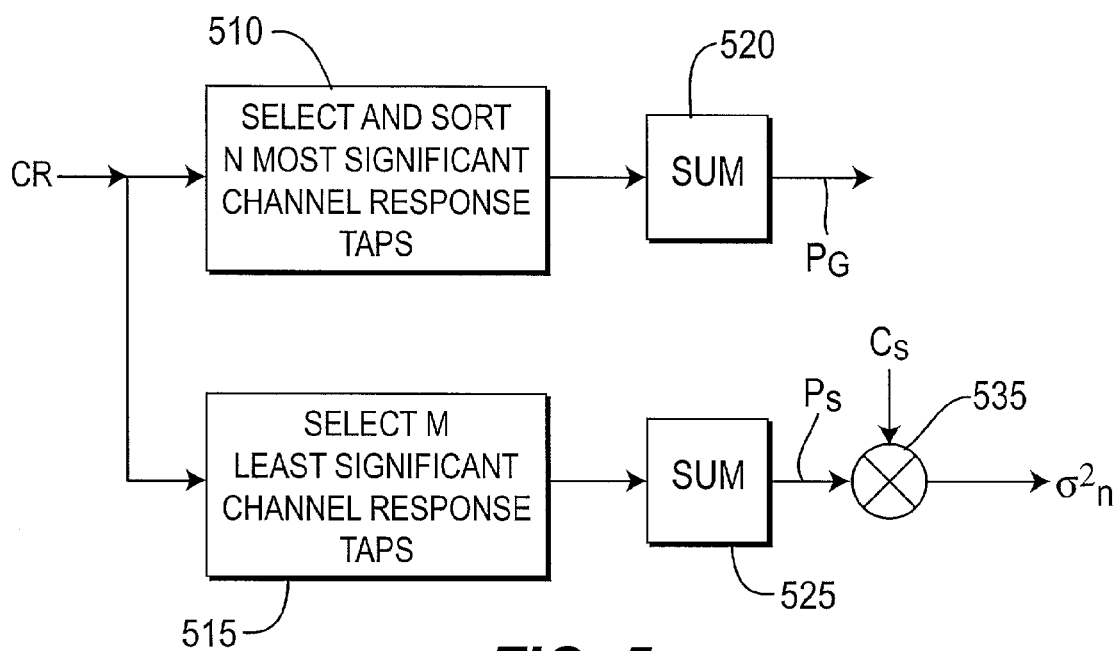
FIG. 5 shows the algorithm for using the insertion sorter to determine noise variance of a communication signal.

FIG. 5 shows an algorithm that makes use of the insertion sorter circuit 200. Input signal CR represents the squared sum of the real and imaginary channel response taps produced by circuit 400 of FIG. 6. The insertion sorter circuit 200 embodies the block 510, 515 and 525 functions. The block 510 of selection and sorting of the N most significant channel response elements is achieved by the comparisons performed by the sorter element comparators $102_1 \ldots 102_N$, and the storage and shifting of the sorter element registers $101_1 \ldots 101_N$. The sorter element comparators $102_1 \ldots 102_N$ and registers $101_1 \ldots 101_N$ likewise perform the block 515 function of selection of the M least significant channel response elements by passing and not storing the least significant values in registers $101_1 \ldots 101_N$. The block 525 sum function is performed by the adder 105 and is stored in register 106. Block 520 is implemented by tapping of the registers $101_1 \ldots 101_N$ and summing the sorted values stored by them once the processing of the series of CR values is completed (not shown in FIG. 2) to form value $P_G$, which represents the channel power estimate. The noise variance $\sigma^2$ is produced by multiplying the value $P_S$, the sum of the noise values stored in register NOISE, with a predetermined scaling factor $C_S$, which is a function of the number of paths and the channel length for the particular system.

Although the invention has been described in part by making detailed reference to certain specific embodiments, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A system having an insertion sorter circuit for determining a predetermined number N of most significant values of a set of random values comprising:
   a plurality of N series-connected sorter elements $SE_i$, for each integer i from 1 to N, for sequentially processing the set of random values;
   each sorter element $SE_i$ sequentially receiving the random values from a respective one of N parallel inputs and including:
      a register $R_i$ for storing a most significant value; and
      a two element comparator $C_i$ for comparing the stored $R_i$ value to a received value of the set of random values; and
   each sorter element $SE_i$ for i>1, also including:
      a multiplexer $M_i$ for selecting between the received value and a register stored value and loading the selected value into the register $R_i$ when the received value is greater than the stored $R_i$ value;
   sorter element $SE_1$ configured to load the received value into register $R_1$ when the received value is greater than the value stored in $R_1$; and
   said sorter elements $SE_1$ to $SE_N$ connected in series such that, for each i>1, the register stored value of the multiplexer $M_i$ is output from the register $R_{i-1}$ when the comparator $C_{i-1}$ determines that the received value is greater than the $R_{i-1}$ stored value, whereby the registers $R_1$ to $R_N$ store N most significant values in a descending order after sequentially processing the set of random values.

2. The system of claim 1 further comprising:
   an adder for summing the random values which are not stored as most significant values after sequentially processing the set of random values; and
   a register for storing the sum of the random values not stored as most significant values.

3. The system of claim 2 which further comprises a circuit for processing received communication data to produce a set of random values representing midamble tap sequence values of a communication signal which are provided to said sorter circuit for processing whereby the N most significant values after sequentially processing the set of random values represent N channel response values of the communication signal, and the sum of the random values, which does not include the N most significant values after sequentially processing the set of random values, represents noise of the communication signal.

4. The system of claim 2 where the sorter elements $SE_1$ to $SE_N$ and the adder operate in parallel to simultaneously process one random value during each processing cycle such that the number of processing cycles needed for sorting and summation is equal to the number of values in the set of random values that are sorted, whereby clock speed of the sorter circuit is unaffected by the number N of sorter elements.

5. A system which processes received communication data where a set of random values represents midamble tap sequence values of a communication signal, N most significant values of the set of random values represent N channel response values of the communication signal, and the sum of the random values which does not include the N most significant values of the set of random values represents noise of the communication signal comprising:

a plurality of N series-connected sorter elements $SE_i$, for each integer i from 1 to N, for sequentially processing the set of values;

each sorter element $SE_i$ sequentially receiving the random values from a respective one of N parallel inputs and including:

a register $R_i$ for storing a most significant value; and a two element comparator $C_i$, for comparing the stored $R_i$, value to a received value of the set of random values; and each sorter element $SE_i$ for i>1, also including:

a multiplexer $M_i$ for selecting between the received value and a register stored value and loading the selected value into the register $R_i$ when the received value is greater than the stored $R_i$ value;

sorter element $SE_1$ configured to load the received value into register $R_1$ when the received value is greater than the value stored in $R_1$; and said sorter elements $SE_1$ to $SE_N$ connected in series such that, for each i>1, the register stored value of the multiplexer $M_i$ is received from the register $R_{i-1}$ when the comparator $C_{i-1}$ determines that the received value is greater than the $R_{i-1}$ stored value whereby the registers $R_1$ to $R_N$ store N most significant values in a descending order after sequentially processing the set of random values; and an adder circuit for summing the random values which are not stored as most significant values after sequentially processing the set of random value, the adder circuit also sequentially receiving each of the random values simultaneously with said sorting elements and a register stored value from the register $R_N$ when the comparator $C_N$ determines that a received value is greater than the $R_N$ stored value including:

a register $R_s$ for storing the sum of the random values not stored as most significant values; and an adder which sums the value stored in the register $R_S$ with the lesser of the received random value and the register stored value of the register $R_N$ and stores the summed value in register $R_S$.

6. The system of claim 5 where the sorter elements $SE_1$ to $SE_N$ and the adder circuit operate in parallel to simultaneously process one random value during each processing cycle such that the number of processing cycles needed for sorting and summation is equal to the number of values in the series of random values that are sorted, whereby clock speed of the sorter circuit is unaffected by the number N of sorter elements.

7. A method for processing received communication data where a set of random values represent midamble tap sequence values of a communication signal, N most significant values of the series of random values represent N channel response values of the communication signal, and a sum of the random values that do not include the N most significant values of the set of random values, the sum representing noise of the communication signal, the method for determining the N channel response values and noise of the communication signal comprising:

sequentially processing the series of random values using an adder circuit having a register $R_S$ initialized with a zero value and a series of sorter elements $SE_i$, for each integer i from 1 to N, each sorter element $SE_i$, having a register $R_i$ initialized with a zero value and a comparator $C_i$;

sequentially receiving the random values from one of N+1 respective parallel inputs by each sorter element $SE_i$ and the adder circuit;

for each received random value, the first sorter element $SE_1$:

compares the stored $R_1$ value to the received value; and stores the selected value into the register $R_1$ when the received value is greater than the existing stored $R_1$ value;

for each received random value, each sorter element $SE_i$, for i>1:

compares the stored $R_i$ value to the received value; and stores a new value into the register $R_i$ when the random value is greater than the existing stored $R_i$ value, and the new value being the random value, except when sorter element $SE_{i-1}$ determines that the received value is greater than the $R_{i-1}$ stored value, in which case the new value stored in register $R_i$ is the register $R_{i-1}$ value, whereby N most significant values are stored in a descending order in registers $R_1$ to $R_N$ after processing all values of the set of random values, the N most significant values representative of N channel response values of the communication signal; and for each received random value, the adder circuit:

sums the value stored in the register $R_S$ with the lesser of the received random value and the $R_N$ stored value; and stores the summed value in register $R_S$ whereby the sum of the values of the random value series which are not stored as most significant values is stored in register $R_S$ after sequential processing of the random value series is completed, the sum representative of the noise of the communication signal.

8. The method of claim 7 where the sorter elements $SE_1$ to $SE_N$ and the adder circuit operate in parallel to simultaneously process one random value during each processing cycle such that the number of processing cycles needed for sorting and summation is equal to the number of values in the series of random values that are sorted, whereby clock speed of the sorter circuit is unaffected by the number N of sorter elements.

* * * * *

UNITED STATES PATENT AND TRADEMARK OFFICE
CERTIFICATE OF CORRECTION

PATENT NO. : 7,177,319 B2 Page 1 of 1
APPLICATION NO. : 10/034824
DATED : February 13, 2007
INVENTOR(S) : Buchert et al.

It is certified that error appears in the above-identified patent and that said Letters Patent is hereby corrected as shown below:

At column 1, line 19, after the words "data and", delete ",".

At column 3, line 60, after the word "elements", delete "150 ... 150N" and insert therefor --1501 ... 150N--.

At claim 5, column 7, line 11, after "Ci", delete --,--.

At claim 5, column 7, line 12, after "Ri", delete --,--.

Signed and Sealed this

Twenty-third Day of October, 2007

JON W. DUDAS
*Director of the United States Patent and Trademark Office*